Figure 1:
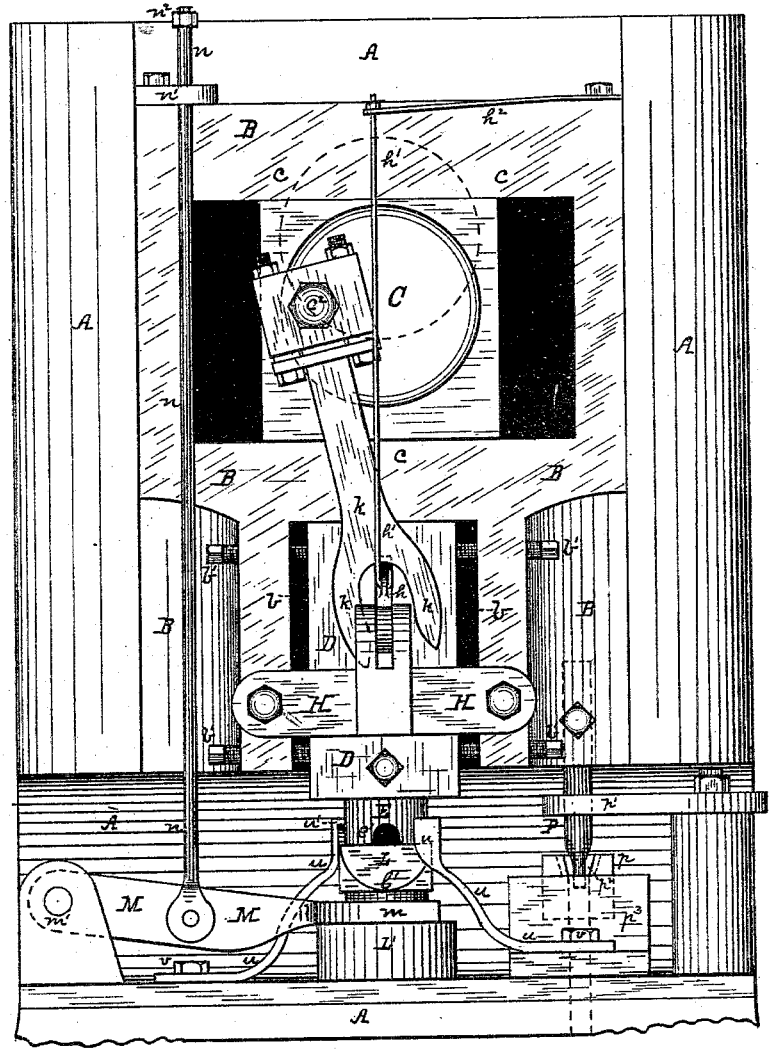

(No Model.) 3 Sheets—Sheet 1.

C. LANZ.
MACHINE FOR MAKING EYE RODS AND HOOK AND EYE HINGES.

No. 296,852. Patented Apr. 15, 1884.

Witnesses:
T. G. Kay
J. Negley Cooke

Inventor.
Charles Lanz
by James T. Kay
Attorney

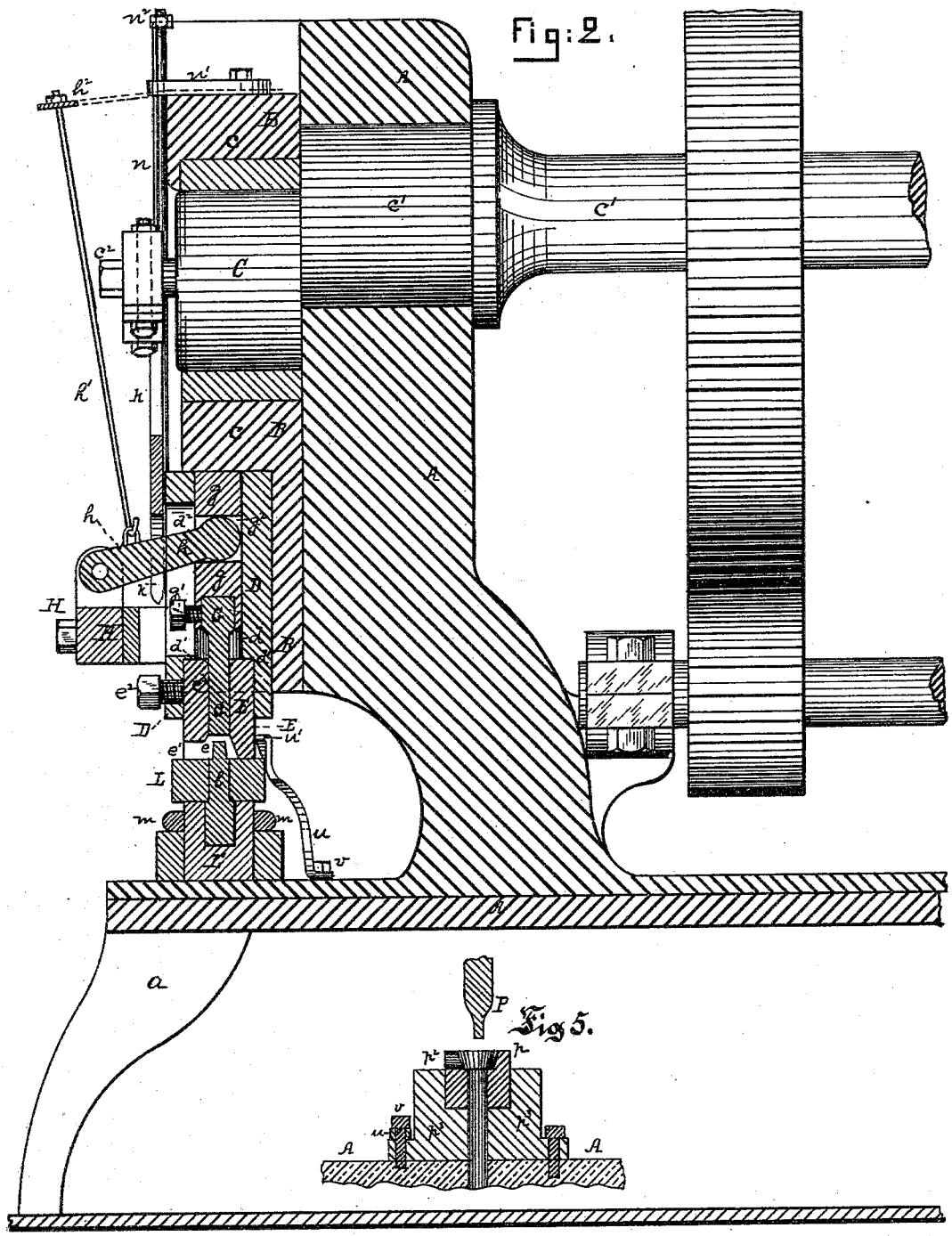

(No Model.) 3 Sheets—Sheet 3.

C. LANZ.
MACHINE FOR MAKING EYE RODS AND HOOK AND EYE HINGES.

No. 296,852. Patented Apr. 15, 1884.

Witnesses.
T. G. Kraig
J. Negley Cooke

Inventor.
Charles Lanz
by James D. Kay
Attorney

N. PETERS, Photo-Lithographer, Washington, D. C.

UNITED STATES PATENT OFFICE.

CHARLES LANZ, OF PITTSBURG, PENNSYLVANIA.

MACHINE FOR MAKING EYE-RODS AND HOOK-AND-EYE HINGES.

SPECIFICATION forming part of Letters Patent No. 296,852, dated April 15, 1884.

Application filed January 17, 1883. (No model.)

*To all whom it may concern:*

Be it known that I, CHARLES LANZ, of Pittsburg, in the county of Allegheny and State of Pennsylvania, have invented a new and useful Improvement in the Manufacture of Eye-Rods and Hook-and-Eye Hinges; and I do hereby declare the following to be a full, clear, and exact description thereof.

My invention relates to the manufacture of eye-rods for hitching-rings, hook-and-eye hinges, and like articles, and to the machinery or apparatus employed for this purpose, and has reference, among other things, to certain improvements in the machinery for the manufacture of these articles, described and shown in Letters Patent granted to me June 15, 1880, and August 24, 1880. In these patents, in forming the eye on the rod in pressing the pintle into the shank and forming the seat at the base of the pintle, the heated and upset end of the rod was pressed into a matrix having a flat base and tapering walls and a side recess in which the rod or shank rested when the end was operated upon, and as the end of the rod was submitted to heavy pressure in the matrix it was difficult to strip the blank out of the matrix, especially after the walls of the matrix had worn, and in some cases the blank would stick on the matrix and necessitate the stopping of the machine and cutting or hammering out of the blank. In forming the eye-rods it was also difficult to strip the blank from the punch which formed the eye partially through the blank, as, if the punch were not more or less tapered, the blank would shrink onto it.

The object of my invention is to overcome these objections to the machinery heretofore employed, and to improve the manufacture of these articles in other particulars.

It consists, first, in forming the matrix with a side recess, and with a movable bottom, which forms the base of the matrix during the forging of the blank, and is then advanced to discharge it from the matrix; second, in the apparatus employed for advancing the movable bottom; third, in the apparatus for stripping the blank from the punch which forms the eye partially through the blank; fourth, in certain improvements in the upset end of the blank, whereby the enlarged or upset portion is guided to the center of the matrix; and, finally, in other improvements in the dies and apparatus employed.

To enable others skilled in the art to carry out my invention, I will describe the same more fully, referring to the accompanying drawings, in which—

Figure 4:
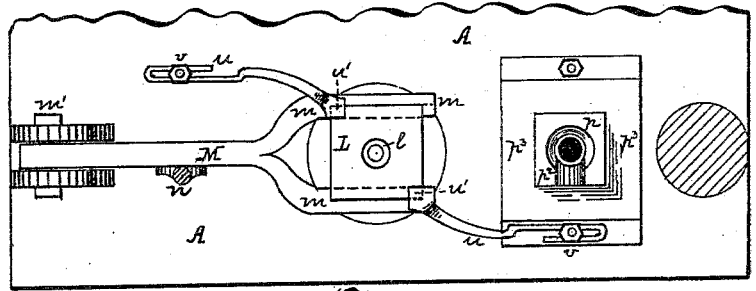
Figure 3:
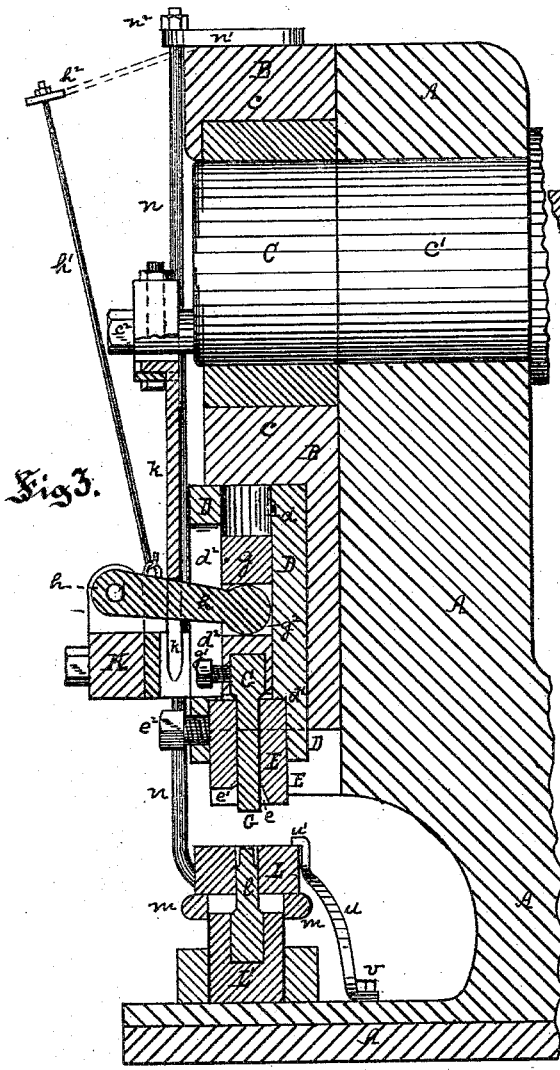
Figure 7:
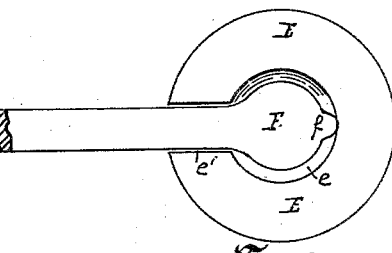
Figure 6:
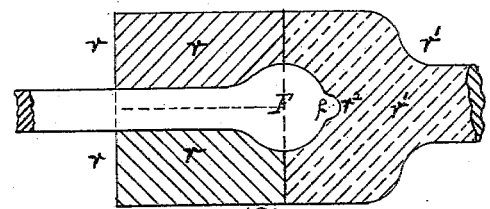
Figure 8:
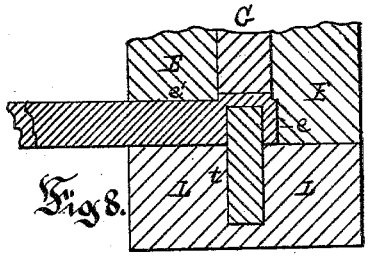
Figure 9:
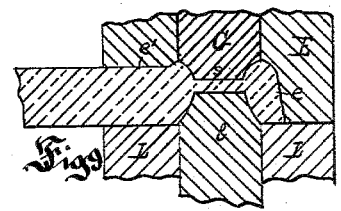
Figure 10:
Figure 11:
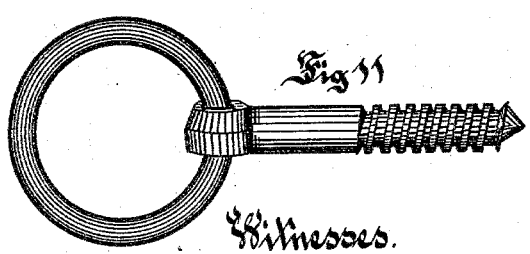

Figure 1 is a face view of my improved apparatus. Fig. 2 is a vertical central section, showing the position of the apparatus in forging the blank. Fig. 3 is a like view, showing the position of the apparatus in discharging the blank. Fig. 4 is a plan view of the anvil and the bottomless matrix. Fig. 5 is a vertical section of the punch and its matrix. Fig. 6 is a sectional view of the upsetting-dies, showing the blank therein. Fig. 7 is a bottom view of the matrix, showing the upset blank therein. Fig. 8 is a sectional view of the dies employed in forming hinge-hooks. Fig. 9 is a sectional view of the dies employed in forming eyes having a bevel or taper in both directions. Fig. 10 is a sectional view of such blank after forging, and Fig. 11 is a view of a finished hitching-ring.

Like letters of reference indicate like parts in each.

In the drawings, A represents the body of my improved apparatus, which is supported on the standards $a$.

B is a reciprocating frame, which moves in suitable guides in the body, and to which a vertical reciprocating motion is imparted by means of the eccentric C, working in the eccentric-box $c$ at the top of the frame, the eccentric being rotated by the shaft $c'$, journaled in the body A. The frame B has a recess, $b$, in the center of the frame below the eccentric-box $c$, and the block D, carrying the matrix-die E, is secured in said recess in the center of the frame by means of the bolts $b'$, the top of the block D resting against the bottom of the eccentric-box and being held against thrust or pressure thereby. The block D has a bore, $d$, extending centrally through it, the bore being enlarged at its base, and the matrix-die E fitting within this enlargement against the annular shoulder $d'$, and being secured therein by the screw-bolt $e^2$.

The dies shown in Figs. 2 and 3 are those employed for forming the eyes for hinge hooks and eyes, and the matrix e has tapering walls conforming in shape to the blank to be forged, and the side recess, e', in which the rod rests while its end is operated on by the dies. The walls of this matrix may be made straight, if desired, as shown in Fig. 8, as the blank is discharged by the direct pressure of the plunger G, forming the movable bottom of the matrix, and tapering walls to free the blank are not required. Extending up from the base of the matrix is the bore $e^3$, in which the plunger G, forming this movable bottom, works, and the plunger is secured by the set-screw $g'$ at the base of the slide $g$, moving vertically in the bore $d$ of the block D, and is so adjusted therewith that when the top of the slide $g$ rests against the frame at the top of the bore $d$ the lower end of the plunger G is flush with and forms the bottom of the matrix $e$, and is thus held against the pressure of the blank in forging. If desired, the plunger G and slide $g$ may be made in one piece; but the other construction is preferred, as the same slide can be employed for all sizes of hooks, and the apparatus can be more easily adjusted. Motion is imparted to this slide $g$ by means of the lever $h$, the end of which fits within the slot $g^2$ in the slide, and this lever $h$ is pivoted in the frame H, bolted to the front of the reciprocating frame B, and extends through the slot $d^2$ in the block D into the slide $g$. The slide $g$ is raised and held against the eccentric-box $c$ by the spring-rod $h'$, connected to the lever $h$ and to the spring $h^2$, secured to and extending out from the top of the reciprocating frame B, and the rod $h'$ thus holds the plunger up in proper position to form the bottom for the matrix $e$ at all times, except when pressed down to discharge the blank, as hereinafter described.

Journaled on a stud or wrist-pin, $c^2$, extending out at one side of the center of the eccentric C, is the forked arm $k$, the fork of which extends down between the frame H and block D, on either side of the lever $h$, and at intervals in the rotation of the eccentric this arm $k$ presses against the lever $h$, and through it presses down the slide $g$ and plunger G. The arm $k$ is journaled on the eccentric in such position that it only presses the plunger out at the time when the matrix-die E and reciprocating frame B are raised by the eccentric, so as to discharge the blank after it has been forged into shape by the downward pressure of the matrix-die.

In forming eye-rods for different purposes, the anvil L, against which the matrix-die presses in forging the blank, is provided with the punch $l$, for forming an eye or hole partially through the blank. This punch $l$ is secured to the anvil-block L', and extends up through a bore in the anvil, being so constructed to arrange the apparatus for stripping the blank from the teat or punch $l$. The sides of the anvil L extend out on either side of the anvil-block, and the arms $m\ m$ of the lever M fit under the anvil on either side of the anvil-block, so that when the lever is raised it raises with it the anvil, and thus causes it to strip the blank from the teat or punch $l$, as shown in Fig. 3. This lever M is pivoted at $m'$ at one side of the anvil-block, and is raised by means of the rod $n$, which extends up in front of the reciprocating frame B, and passes through the bearing $n'$, secured to and extending from the top of the frame. A nut or stop, $n^2$, is screwed on the rod above the bearing, and whenever the frame B is raised sufficiently high to bring the bearing $n'$ against the nut or stop it causes it to draw up the rod $n$, and through it to raise the anvil, as above described. As the pressure of the arms $m\ m$ on the anvil must necessarily be in a vertical line, to prevent the anvil from catching on the punch $l$ the parts of the anvil extending over the arms are cut away, so as to leave shoulders $l'$ in the center, so that the arms $m\ m$ only press against these shoulders $l'\ l'$, and thus raise the anvil in a true vertical line. As the pressure of the arms is liable to throw the anvil L off the punch, and the punch $l$ is cylindrical, so that the anvil can turn thereon, I secure to the bed of the machine the arms $u$, which extend up along the sides of the anvil L a short distance above the anvil, as shown in Fig. 2, and have the lips $u'$, which extend over the anvil and catch it in case it is raised too high. The lips $u'$ are about level with the top of the punch $l$, so that the anvil will strip the blank from the punch before it is caught by these lips. The sides of these arms fit along the sides of the anvil, or around the corners thereof, and so prevent it from turning. The arms $u$ are secured in place by bolts $v$, extending through a slot in the arms, so that they can be readily removed to change the punch and anvil.

At one side of the forging-dies is located the punch P, for punching out the burr left in the blank after forging, these dies being more clearly shown in Fig. 5. This punch is secured at the base of the reciprocating frame B, and passes through the stripper $p'$, by means of which the punched blank is stripped from the punch. Supported on the body A below this punch is the bottomless matrix $p$, in which the blank is supported during punching, this matrix having its walls conforming approximately to the blank to be punched, so as to support it, and having a side recess, $p^2$, in which the body of the blank rests during punching. The block $p^3$, in which the matrix $p$ is held, has a bore extending through it, through which the burr punched out falls.

In Fig. 6 are shown the upsetting-dies, which form the bulb or enlarged head F on the rod before forging, $r\ r$ being the clamping-dies and $r'$ the upsetting-die. As the upset head F on the rod does not fill the matrix $e$ until forged out and spread by the punch $l$ or the pintle in making hinge-hooks, and it is desirable that the blank be held in the center of the matrix, a recess, $r^2$, is formed at the base of the cavity of the upsetting-die, which forms a teat, $f$, at the end of the upset head, and thus holds the head the required distance out from the walls of the matrix and guides the head F to the center thereof, as shown in Fig. 7.

In Fig. 9 are shown the dies employed in forming eye-rods, having a bevel or taper in both directions, such as the screw-rods of hitching-rings, as shown in Fig. 11. In these dies the matrix $e$ has tapering walls, and the plunger G, forming the movable bottom of the matrix, has a short teat or extension, $s$, on the end thereof, the punch $l$ extending up from the anvil L, being longer than this teat $s$, so that when the blank is forged in the dies the burr between the teat $s$ and punch $l$ is formed above the center of the blank, and in forging these eyes the blank is turned over and again forged within the dies, when the burr is forced upward by the punch $l$, and thus loosened to facilitate its removal. In the first forging the outer walls are formed tapering from the base of the ring or eye upward, conforming to the shape of the dies, as shown within the dies, Fig. 9, and the second forging, where the blank is turned over, the metal at the base of the ring or eye is swaged down, and the blank thus formed beveled or tapering in both directions, as shown in Figs. 10 and 11.

In Fig. 8 are illustrated the dies employed in forming hook-hinges. In it the same matrix-die E, with movable bottom G, is employed, and the anvil L, instead of having a punch, has a bore, $t$, extending down centrally of the matrix, part way through the anvil, in which the pintle of the hinge is placed, as described in the Letters Patent granted to me August 24, 1880, above referred to. The walls of the matrix $e$ (shown in this figure) are perpendicular for making the walls of the hinge perpendicular, as is sometimes desired. This form of hinge, whether eye or hook, can be delivered from the matrix by means of the movable plunger-bottom G. If desired, the anvil L may be divided in a line centrally across the bore $t$, to facilitate the insertion of the pintle and removal of the hook.

In forging blanks by my invention, the end of the rod on which the eye is to be formed is heated in a suitable furnace, and it is then placed between the clamping-dies $r\ r$, and the head F upset thereon by the die $r'$, the teat $f$ being forged thereon by the recess $r^2$. The upset head F, while still heated, is then placed within the matrix $e$, the rod fitting within the side recess, $e'$, and as the reciprocating frame B descends it forges the upset head between it and the anvil L, the blank being conformed to the shape of the matrix, and the punch $l$ forming the eye part way through. As the slide $g$, supporting the movable plunger-bottom G of the matrix, is held by the rod $h'$ against the eccentric-box $c$, the movable bottom G has a solid support against the pressure of the blank in forging it. As the eccentric C is rotated by its shaft $c'$, it raises the frame B, and as the wrist-pin $c^2$ descends on the rotation of the eccentric, it causes the forked arm $k$ to press against the lever $h$, which presses out the plunger G and causes it to discharge the blank from the matrix in case it is lodged therein. As soon as the eccentric raises the forked arm clear of the lever, the rod $h'$ raises the lever $h$, and thus draws the plunger G back to its normal position, when the apparatus is ready to forge another blank. During this operation the reciprocating frame B has raised the rod $n$, and through it the lever M and anvil L, as above described, and thus stripped the blank off the punch $l$ in case it should shrink thereon, the anvil being held in proper position and prevented from rising too far by the arms $u$ and lips $u'$. The blank is then placed in the matrix $p$ and the burr therein punched out by the punch P, when it is finished ready for threading.

In forming eye-rods having a bevel or taper in both directions by means of the dies shown in Fig. 7, the operation is the same, except that after the first forging the blank is turned over and the ring formed placed within the matrix $e$ and again forged, as above described. It is then placed in the matrix $p$ and the burr punched out at the descent of the punch P.

In forming hinge-hooks, the anvil L, (shown in Fig. 8,) having the bore $t$, is secured to the anvil-block L', and the pintle of the hinge placed in the bore thereof. The shank having the upset head F is then placed in the matrix, which forces the head around the pintle, and imparts to it its exterior form, the anvil forming the flat seat for the eye of the hinge. The heated metal of the shank then shrinks on the pintle, holding it securely therein. Then the hook is withdrawn and is ready for the screw-thread.

What I claim as my invention, and desire to secure by Letters Patent, is—

1. In dies for forging eye-rods and hooks, a matrix having a side recess and a movable bottom adapted to be advanced after the forging of the blank, and discharge it from the matrix, substantially as set forth.

2. In dies for forging eye-rods and hooks, the matrix-die E, having the matrix $e$, provided with a side recess, $e'$, in combination with the movable plunger-bottom G, and lever $h$, substantially as and for the purposes set forth.

3. In dies for forging eye-rods and hooks, the combination, with the reciprocating frame, of the block D, secured therein, and having the bore $d$, the die E, secured in said block, and having the matrix $e$, and the movable plunger G, forming the bottom of said matrix during forging, and adapted to discharge the forged blank, substantially as set forth.

4. In combination with the matrix-die E, the movable plunger-bottom G, lever $h$, and spring-rod $h'$, substantially as and for the purposes set forth.

5. In combination with the matrix-die E, the plunger G, slide $g$, having the slot $g^2$, and lever $h$, pivoted in the frame H, substantially as set forth.

6. In combination with the block D, having the bore $d$, and slot $d^2$, the matrix-die E at the base of the block, plunger G, within said bore $d$, and lever $h$, extending through said slot $d^2$ into the plunger, substantially as and for the purposes set forth.

7. In combination with the movable plunger G, and lever $h$, the forked arm $k$, adapted to press down said lever and plunger after the forging operation, substantially as and for the purposes set forth.

8. In combination with the eccentric C, the arm $k$, journaled at one side of the face thereof, substantially as and for the purposes set forth.

9. In combination with the lever $h$, the eccentric C, having the wrist-pin $c$, extending out from the face thereof, and the arm $k$, journaled on said pin, and adapted to press upon said lever, substantially as and for the purpose set forth.

10. In combination with the lever $h$, the arm $k$, adapted to press thereon, and the spring-rod $h'$, substantially as and for the purposes set forth.

11. The combination of the anvil L, punch $l$, extending through said anvil, and lever M, extending under and adapted to raise the anvil, substantially as and for the purposes set forth.

12. The combination of the punch $l$, the anvil L, fitting around said punch, and having the shoulders $l'$, and the lever M, having the arms $m\ m$, adapted to press against said shoulders and raise said anvil, substantially as and for the purposes set forth.

13. In combination with the anvil L, the lever M, the rod $n$, and the reciprocating frame B, substantially as and for the purposes set forth.

14. In combination with the anvil L, the lever M, the rod $n$, having the stop $n^2$, and reciprocating frame having the bearing $n'$, through which the rod passes, substantially as and for the purposes set forth.

15. In combination with the punch $l$ and the vertically-movable anvil L, the arms $u$, having lips $u'$, for limiting the movement of the anvil, substantially as set forth.

16. In combination with the punch $l$ and vertically-movable anvil L, the arms $u$, fitting against said anvil, and having lips $u'$, extending above it, substantially as and for the purposes set forth.

17. The combination of the matrix-die having the matrix $e$ and side recess, $e'$, the movable plunger-bottom G, having the short teat $s$, and the anvil L, having the punch $l$, of greater length than the teat $s$, substantially as and for the purposes set forth.

In testimony whereof I, the said CHARLES LANZ, have hereunto set my hand.

CHARLES LANZ.

Witnesses:
JAMES I. KAY,
J. N. COOKE.